United States Patent
Knüttel et al.

(10) Patent No.: US 8,771,573 B2
(45) Date of Patent: Jul. 8, 2014

(54) METHOD FOR PRODUCING A PLASTIC HOUSING COMPRISING AN INCORPORATED GUIDE AND/OR BEARING FOR MECHANICAL COMPONENTS

(75) Inventors: Bernhard Knüttel, Bad Neustadt (DE); Annegret Suckfüll, Mittelstreu (DE)

(73) Assignee: Preh GmbH (DE)

( * ) Notice: Subject to any disclaimer, the term of this patent is extended or adjusted under 35 U.S.C. 154(b) by 880 days.

(21) Appl. No.: 12/596,550

(22) PCT Filed: Apr. 18, 2008

(86) PCT No.: PCT/EP2008/003137
§ 371 (c)(1),
(2), (4) Date: Oct. 19, 2009

(87) PCT Pub. No.: WO2008/128722
PCT Pub. Date: Oct. 30, 2008

(65) Prior Publication Data
US 2010/0108450 A1   May 6, 2010

(30) Foreign Application Priority Data

Apr. 20, 2007 (DE) .......................... 10 2007 019 136
Dec. 22, 2007 (DE) .......................... 10 2007 062 356

(51) Int. Cl.
*B28B 7/22* (2006.01)

(52) U.S. Cl.
USPC .................. 264/255; 264/271.1; 264/272.11; 264/274; 264/277; 264/279; 264/279.1; 264/254; 264/260; 264/265

(58) Field of Classification Search
USPC ......... 264/255, 240, 241, 248, 249, 254, 259, 264/260, 263, 266, 271.1, 272.11, 272.14, 264/272.2, 275, 279, 279.1, 294, 297.2, 264/297.8, 299, 328.8
See application file for complete search history.

(56) References Cited

U.S. PATENT DOCUMENTS

| | | | |
|---|---|---|---|
| 3,689,880 A * | 9/1972 | Robert G. McKee et al. .............................. | 340/454 |
| 5,462,622 A | 10/1995 | Small et al. | |
| 2005/0068746 A1 * | 3/2005 | Weisz-Margulescu et al. .............................. | 361/728 |

FOREIGN PATENT DOCUMENTS

| | | |
|---|---|---|
| DE | 19632766 A1 | 2/1998 |
| EP | 0477653 A2 | 4/1992 |
| EP | 1696212 A1 | 8/2006 |

OTHER PUBLICATIONS

International Search Report PCT/EP2008/003137; Dated Sep. 16, 2008.

*Primary Examiner* — Jeffrey Wollschlager
*Assistant Examiner* — Stella Yi
(74) *Attorney, Agent, or Firm* — Cantor Colburn LLP

(57) ABSTRACT

The invention relates to a method for producing a plastic housing, where at least one first plastic housing part with at least one guide or bearing for at least one mechanically movable component, in particular a sensor, is produced in a first molding step, the at least one first plastic housing part is overmolded in a second molding step while a second plastic housing part is being formed, in order to form an integral plastic housing. Moreover, the invention relates to a plastic housing with at least one first plastic housing part including at least one guide or bearing for at least one mechanically movable component, where the at least one plastic housing part is entirely or partially overmolded by a second plastic housing part so that the integral plastic housing is formed.

12 Claims, 2 Drawing Sheets

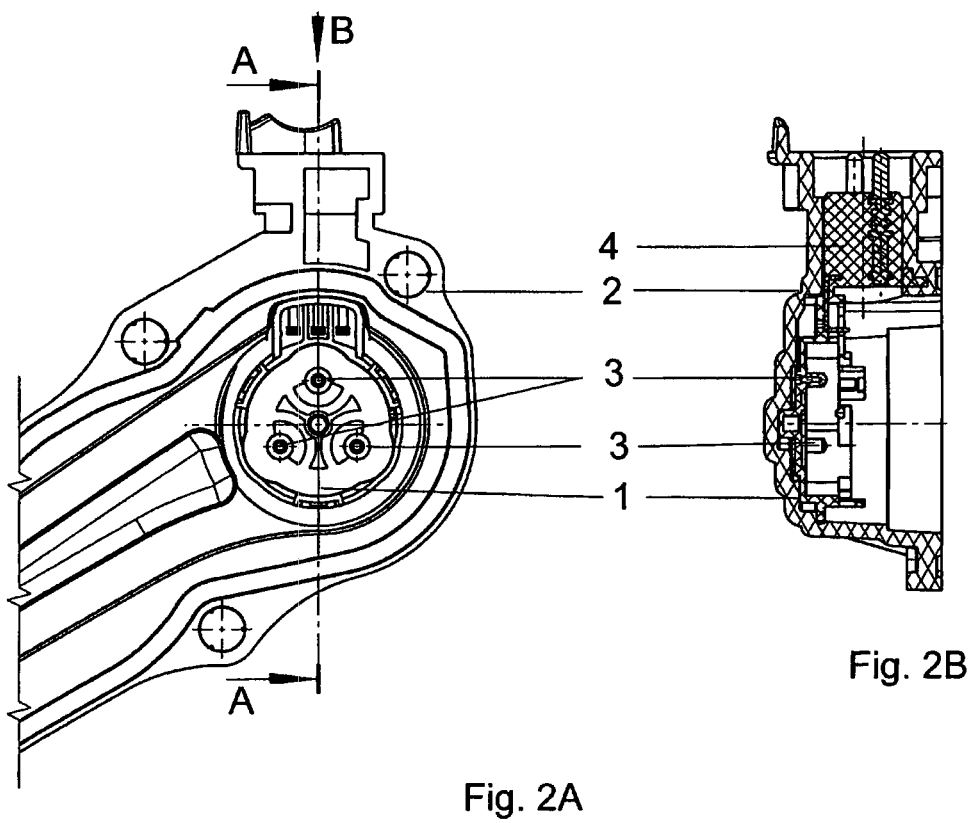
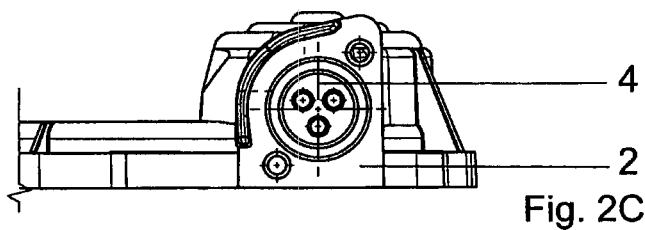
Fig. 2B
Fig. 2A
Fig. 2C

METHOD FOR PRODUCING A PLASTIC HOUSING COMPRISING AN INCORPORATED GUIDE AND/OR BEARING FOR MECHANICAL COMPONENTS

CROSS-REFERENCE TO RELATED APPLICATIONS

This patent application claims priority to co-pending German Patent Application DE filed which is hereby expressly incorporated by reference in its entirety as part of the present disclosure.

The invention generally relates to a plastic housing with an integrated guide and/or bearing for at least one mechanically movable component, in particular for that of a sensor. In order to reduce the manufacturing costs, and for reasons of efficiency in maintenance, there is a fundamental need for highest integration density; it is thus desirable not to form the guide or bearing of the mechanical components as separate members that are to be attached to the housing in a later manufacturing step, but to integrate them directly into the plastic housing. This poses the problem, however, that plastic housings, because of the plastic materials used and/or the function-based geometry which is not optimized for plastics and/or the effect of heat during the production manufacturing, tend to distort and are subject to shrinking processes, so that deviations with regard to the dimensions and the geometry of the housing are inevitable. With regard to the guide or bearing of a mechanical component which is incorporated into the plastic housing, these deviations would cause malfunctions or at least intolerable variations with regard to the sequence of movements of the mechanical component caused by skewing, distortion and warping. Mostly, a correction of the molding tool is not possible because these geometries are not in the release direction anymore. These deviation particularly constitute an interference if a mechanical movable component of a sensor is concerned. The sensor could be or become inoperable, its measurement results could be subject to large measurement errors, or each sensor would have at least to be elaborately calibrated. This is of even more considerable importance if the quantity detected by the sensor is a safety-relevant quantity, as is the case, for example, when detecting the adjustment path of a brake for detecting the wear of a brake lining of a vehicle. In order to solve the problem, the plastic housing was so far produced in two parts: first, a first plastic housing was produced on which at least one guide and/or bearing integrated therein was provided for at least one mechanically movable component, which in a subsequent step was inserted into a separately produced second plastic housing or mechanically attached thereto. For example, the first plastic housing part is inserted into a recess of the second plastic housing part and/or connected with the latter by at least a snap-in connection or screw connection. Disadvantageously, this requires a second assembly step. Moreover, these connections disadvantageously often exhibit clearance, so that a time-consuming adjustment or calibration is required in the case where the first plastic housing part serves as a support for the mechanical components of a sensor.

BRIEF DESCRIPTION OF RELATED ART

It is therefore the object of the present invention to provide a method for producing a plastic housing with a guide and/or bearing integrated therein for at least one mechanically movable component, by means of which the plastic housing can be produced inexpensively and simply, with, at the same time, a high dimensional stability of the guide or bearing. This object is achieved by means of a method according to claim 1, as well as by a plastic housing according to the independent claim. The dependent claims respectively relate to advantageous developments.

BRIEF SUMMARY OF THE INVENTION

The method according to the invention for producing a plastic housing provides that at least a first plastic housing part with at least one guide or bearing for at least one mechanically movable component is produced in a first molding step. In a second molding step, the at least one first plastic housing part is overmolded while forming a second plastic housing part in order to form an integral plastic housing together with the first plastic part. By producing a first plastic housing with the at least one guide or bearing of the mechanically movable component in a preceding and separate step, the guide or bearing, also referred to a functional geometry, can be manufactured particularly exactly and/or in a dimensionally very stable molding process, independent from the production of the second molding process. For example, the functional geometry is a bearing for one or more gear wheels. The dimensional stability or precision of the first molding step is based, for example, on the type of plastic used, the design being suitable for plastic, the type of molding process used and/or the type of molding tool. In the further processing of this first plastic housing part in the second molding step, this first plastic housing part is overmolded, preferably injection-overmolded, by a second plastic housing part. The plastic housing parts thus connected integrally thus form the integral plastic housing part. When the first plastic housing part is overmolded, preferably injection-overmolded, with the second plastic housing part, the dimensioning of the functional geometry is not affected, that is, the bearing or guide of a mechanically movable component, which is provided on the first plastic housing part, is not distorted, warped or skewed, etc. A bearing or guide of the movable components that is secure, correctly positioned and defined is thus ensured. Moreover, the integratedness of the first and the second plastic housing part leads to a clearance-free, secure connection between the housing parts and thus to an interference-free movement function of the component guided or supported by the guide or bearing. In addition, assembly is expedited by the integratedness, and additional components for the connection, such as, for example, screw connections, seals etc. can be omitted, which is advantageous for reasons of costs and storage.

Preferably, the plastic housing parts are manufactured by injection molding in the first and second molding steps, more preferably in both molding steps. The plastic housing part can thus be manufactured inexpensively. The plastic used is, for example, a thermoplastic, duroplastic or elastomer. For example, the plastic is a polyolefin, preferably a polypropylene, for example, a plexiglass (PMMA) or polycarbonate (PC), if a transparent plastic housing is desired, for example polystyrene (PS) and its copolymers, polyamide (PA) or polyoxymethylene (POM). Other plastics used in the sensor area include polybutylene terephtalate (PBT) and polyphenyl sulfide (PPS). In order to increase strength and to minimize shrinkage, plastic housing parts are manufactured from fiberglass-reinforced plastics, with the glass fibers having different orientations. In order to optimize and eliminate shrinkage, mineral or glass sphere fillings may also be provided, which, however, causes a lower strength in the plastic housing part.

The tolerances to be set in the plastic housing part are adjustable, on the one hand, by the selection of the plastic or the constituents integrated in the plastic, and, beyond that, by a design of the housing part suitable for plastic. In the process, a dimensional stability in accordance with DIN 16901 tolerance group precision engineering can be realized.

For example, the first plastic housing part, the so-called pre-molded part, can be manufactured from a plastic which is particularly impact-resistant, or particularly resistant against fuels and lubricants or heat, or which is subject to low shrinkage during injection molding, such as polyamide, whereas the second plastic part can be manufactured from a comparatively less expensive plastic, such as polypropylene, due to the lower requirement this part has to satisfy.

Preferably, the guide or bearing provided in the first plastic housing part is intended for at least one mechanically movable component of a sensor. The dimensional stability of the functional geometry of the first plastic housing part which results according to the invention ensures a reliable and, moreover, exact measurement by the sensor. Because of the almost clearance-free support of the sensor by the integral plastic housing, a calibration process of the sensor can thus be omitted.

According to another preferred embodiment, the sensor is a brake lining wear sensor, and the plastic housing is formed as a housing, for example, hood-shaped, for at least partially covering a brake lining adjusting mechanism of a vehicle. The brake lining wear sensor serves for measuring the displacement of a brake lining relative to the associated brake caliper caused by wear. The integration according to the invention of the first plastic housing as a support for essential parts of the brake lining wear sensor into the second plastic housing, which is hood-shaped, for example, has proved to be very reliable. The overmolding provides for a clearance-free support of the movable components of the brake lining wear sensor, and thus for a high measuring accuracy with regard to the particularly safety-relevant measurement quantity to be determined. Moreover, the housing including the brake lining wear sensor can thus be mounted within narrow manufacturing tolerances and using a reduced number of assembly components. Because of the narrow manufacturing tolerances, a calibration of the sensor can be dispensed with. The brake lining wear sensor for example comprises a gear unit, in particular planetary gear unit, for translating the displacement caused by wear into a rotational movement. The conversion of the generally linear, but primarily small relative displacement, or relative shift, between the lining and the caliper into a rotational movement enables an exact detection by the sensor. On the one hand, this is due to the fact that a rotational movement is more easily detectable, and on the other hand, that the reduction ratio can be or is easily adjusted such that the comparatively small linear movement is accompanied by a comparatively large rotational deflection. In one embodiment, the functional geometry serves for supporting the gear wheels of a planetary gear unit. Here, the infeed is carried out via a rotational movement with a spindle with, for example, 10 rotations over the entire wear.

In another preferred embodiment, an electrical connecting plug or electrical socket is formed in the first plastic housing part during the first molding step. The connecting plug or the socket can thus be manufactured with a high dimensional stability, and the electrical plug-in connection to be manufactured mechanically is achieved reliably and in a way that is unsusceptible against interference. It can be considered another advantage that an additional contacting area for the sensor element is dispensed with.

The invention moreover relates to a plastic housing with at least a first plastic housing part comprising at least one guide or bearing for at least one mechanically movable component. The plastic housing is characterized in that the at least one first plastic housing part is overmolded while a second plastic housing part is being formed, in order to form an integral plastic housing. As was described above with reference to the method according to the invention, by producing a first plastic housing with the at least one guide or bearing of the mechanically movable component in a preceding and separate step, the guide or bearing—the functional geometry—can be manufactured particularly exactly and/or in a dimensionally very stable molding process, independent from the manufacturing step of the second molding process. For example, the functional geometry is a bearing for one or more gear wheels. The dimensional stability or precision of this first molding step is based, for example, on the type of plastic used, the possible optimal geometry, the type of molding process used and/or the type of molding tool. The plastic housing parts connected integrally by overmolding thus form the integral plastic housing part. When the first plastic housing part is overmolded with the second plastic housing part, the dimensioning of the functional geometry is not affected, that is, the bearing or guide of a mechanically movable component, which is provided on the first plastic housing part, is not distorted, warped or skewed, etc. Moreover, the integratedness of the first and the second plastic housing part leads to a clearance-free, secure connection between the parts and thus to an interference-free movement function of the component guided or supported by the guide or bearing. In addition, assembly is expedited by the integratedness, and additional components for the connection, such as, for example, screw connections, seals etc. can be omitted, which is advantageous for reasons of costs and storage.

As was already explained above, the guide or bearing provided in the first plastic housing part is preferably intended for at least one mechanically movable component of a sensor. The dimensional stability of the functional geometry of the first plastic housing part which results according to the invention ensures a reliable and, moreover, exact measurement by the sensor. Because of the almost clearance-free support of the sensor by the integral plastic housing, a calibration process of the sensor can thus be omitted.

According to another preferred embodiment, the sensor is a brake lining wear sensor, and the plastic housing is formed as a housing for at least partially covering a brake lining adjusting mechanism of a vehicle, which is disposed, for example, in the area of the brake caliper. The brake lining wear sensor serves for measuring the displacement of a brake lining relative to the associated brake caliper caused by wear. The integration according to the invention of the first plastic housing as a support for essential parts of the brake lining wear sensor into the second plastic housing, which is hood-shaped, for example, has proved to be very reliable. The overmolding provides for a clearance-free support of the brake lining wear sensor, and thus for a high measuring accuracy with regard to this particularly safety-relevant measurement quantity. Moreover, the housing including the brake lining wear sensor can thus be mounted with narrow manufacturing tolerances and using a reduced number of assembly components. Because of the narrow manufacturing tolerances, a calibration of the sensor can be dispensed with. The brake lining wear sensor for example comprises a gear unit, in particular planetary gear unit, for translating the displacement caused by wear into a rotational movement. The conversion of the generally linear, but primarily small relative displacement, or relative shift, between the lining and the caliper into a rotational movement enables an exact detection by the sensor. On the one hand, this is due to the fact that a rotational movement is more easily detectable, and on the other hand, that the reduction ratio can be or is easily adjusted such that the comparatively small linear movement is accompanied by a comparatively large rotational deflection. In one embodiment, the functional geometry serves for supporting the gear wheels of a planetary gear unit.

Preferably, the first plastic housing part comprises at least one electrical connecting plug or an electrical socket. As was already mentioned, the connecting plug or the socket can thus also be manufactured with a high dimensional stability, and the electrical plug-in connection to be manufactured mechanically is realized reliably and remains unsusceptible against interference.

Moreover, the invention relates to a brake adjusting mechanism for a motor vehicle as well as to the associated motor vehicle with an apparatus for measuring the displacement of a brake lining caused by wear with a plastic housing in one of the above-described embodiments for at least partially covering the brake lining adjusting mechanism. For example, the brake adjusting mechanism is a mechanical or electromechanical adjusting device of the brake lining. These adjusting devices are present in nearly all vehicles, with an adjusting device which can be advantageously combined in particular with the plastic housing according to the invention being used in the brakes manufactured for utility vehicles by Knorr-Bremse AG. For example, the adjusting device comprises a chain drive consisting of sprocket and chain driven by an electromotor and/or hydraulically by an air-driven cylinder.

A preferred embodiment of the plastic housing according to the invention is shown in the attached figures as a hood-shaped cover of a brake lining adjusting mechanism as it is manufactured for utility vehicles by Knorr-Bremse AG.

BRIEF DESCRIPTION OF THE SEVERAL VIEWS OF THE DRAWING

FIG. 2A is a top view of the integral plastic housing obtained by overmolding (injection-overmolding) of the first plastic housing part (pre-molded part) with the second, plastic housing part, onto the functional geometry for supporting the movable components (gear wheels) of the brake lining wear sensor (not shown), FIG. 2B is the associated sectional view along the line of cut A-A from FIG. 2A, FIG. 2C is a side view corresponding to the viewing direction indicated by the arrow B in FIG. 2A.

DETAILED DESCRIPTION OF THE INVENTION

Figures 1A, 1B:
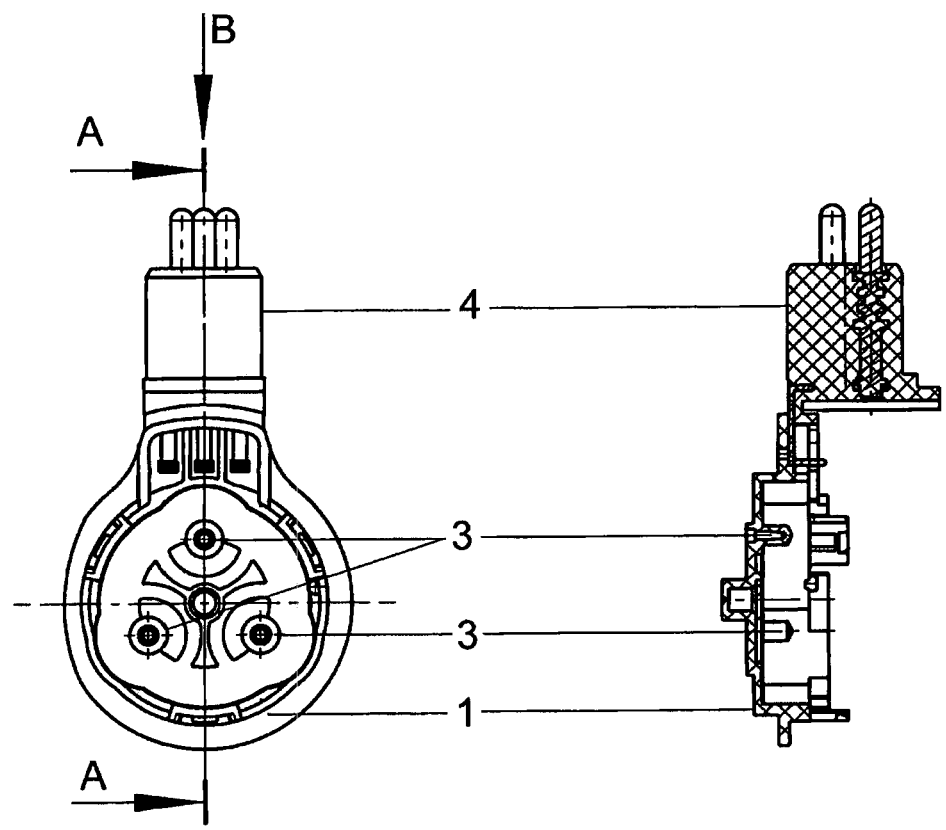
FIG. 1A is a top view of the first plastic housing part (pre-molded part) onto the functional geometry for supporting the movable components (gear wheels) of the brake lining wear sensor (not shown)
FIG. 1B is the associated sectional view along the line of cut A-A from FIG. 1A.
Figure 1C:
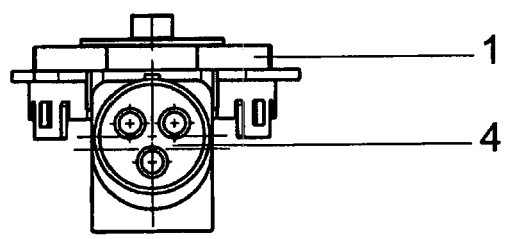
FIG. 1C is a side view corresponding to the viewing direction indicated by the arrow B in FIG. 1A.

The first plastic housing part 1, which is manufactured as a pre-molded part by injection molding, is shown in the FIGS. 1A to 1C. It substantially has a disc-shaped configuration with an appendage pointing away radially to the side, which contains an electrical plug-in connection 4. For this purpose, electrical conductors were overmolded by the plastic material of the first plastic housing part 1. A plurality of bearings 3 for gear wheels is formed in the disc-shaped external surface of the first plastic housing part 1. These bearing pins 3 serve for the rotatable bearing of gear wheels (not shown), which in turn are part of a planetary gear unit belonging to the brake lining wear sensor. This gear unit serves for the translation of the displacement caused by wear into a rotational movement detected by the sensor. The plastic housing part 1 forms part of a sensor housing and is to be connected by means of latches for connection with another part of the housing (not shown). The pre-molded part 1 thus manufactured is inserted into an injection mold and overmolded. The second plastic housing part 2 is formed in the process, and this is integrally connected with the first plastic housing part 1, the pre-molded part. The two parts form the above-mentioned hood-shaped housing 1, 2 for the brake lining adjusting mechanism as it is manufactured for utility vehicles by Knorr-Bremse AG. An integral cover, which is advantageous for assembly reasons, is obtained by injection-overmolding the first plastic housing part 1, with a precise alignment of the moveable components (gear wheels) of the sensor supported by the plastic housing part being achieved. Since, in addition, the dimensional stability of the functional geometry 3, that is, the bearing pins, is not adversely affected during the injection-overmolding, the function of the sensor is not affected.

What is claimed is:

1. Method for producing a plastic housing, comprising:
providing a brake lining wear sensor configured for measuring a displacement of a brake lining relative to an associated brake caliper caused by wear, whereby a linear displacement is converted into a rotational movement by means of planetary gear unit and the brake lining wear sensor measures the resulting rotational movement;
molding a least one first plastic housing part with a disc shaped configuration and a functional geometry into a disc shaped external surface, the functional geometry being shaped as a plurality of bearing pins configured for rotatable bearing of gear wheels of the planetary gear unit, wherein a plurality of gear wheels are mechanically moving components of the brake lining wear sensor;
entirely or partially overmolding the at least one first plastic housing part while a second plastic housing part is being formed; and
forming an integral plastic housing via said molding and overmolding.

2. Method for producing a plastic housing according to claim 1, wherein, in the molding and/or the overmolding, first and/or second plastic housing part are produced by injection molding.

3. Method for the producing of a plastic housing according to claim 1, wherein the plastic housing is formed as a housing for at least partially covering a brake lining adjusting mechanism of a motor vehicle.

4. Method for producing a plastic housing according to claim 1, wherein an electrical connecting plug or socket is formed in the first housing part during the molding.

5. Method for producing a plastic housing according to claim 1, wherein the first plastic housing part is molded from a first plastic and the second plastic housing part is molded from a second plastic that is different from the plastic.

6. Method for producing a plastic housing according to claim 1, wherein the first plastic housing part is molded from polyamide and the second plastic housing part is molded from polypropylene.

7. Method for producing a plastic housing for a brake lining comprising:
providing a brake lining wear sensor configured for measuring a displacement of a brake lining relative to an associated brake caliper caused by wear, whereby a linear displacement is converted into a rotational movement by means of a planetary gear unit and the brake lining wear sensor measures the resulting rotational movement;

molding at least one first plastic housing part with a disc shaped configuration and a functional geometry into a disc shaped external surface, the functional geometry being shaped as a plurality of bearing pins configured for rotatable bearing of gear wheels of he planetary gear unit, wherein a plurality of gear wheels are mechanically moving components of the brake lining wear sensor;

entirely or partially overmolding the at least one first plastic housing part while a second plastic housing part is being formed; and forming an integral plastic housing via said molding and overmolding, wherein the integral plastic housing is hood-shaped and the plurality of bearing pins project into the internal space of the hood-shaped integral plastic housing.

8. Method for producing a plastic housing according to claim 7, wherein , in at least one of the molding and the overmolding, at least one of the first plastic housing and the second plastic housing part is produced by injection molding.

9. Method for producing a plastic housing according to claim 7, wherein the plastic housing is formed as a housing for at least partially covering a brake lining adjusting mechanism of a motor vehicle.

10. Method for producing a plastic housing according to claim 7, wherein an electrical connecting plug or socket is formed in the first plastic housing part during the molding.

11. Method for producing a plastic housing according to claim 7, wherein the first plastic housing part is molded from a first plastic and the second plastic housing part is molded from a second plastic that is different from the first plastic.

12. Method for producing a plastic housing according to claim 11, wherein the first plastic housing part is molded from polyamide and the second plastic housing part is molded from polypropylene.

* * * * *